Figure 1:
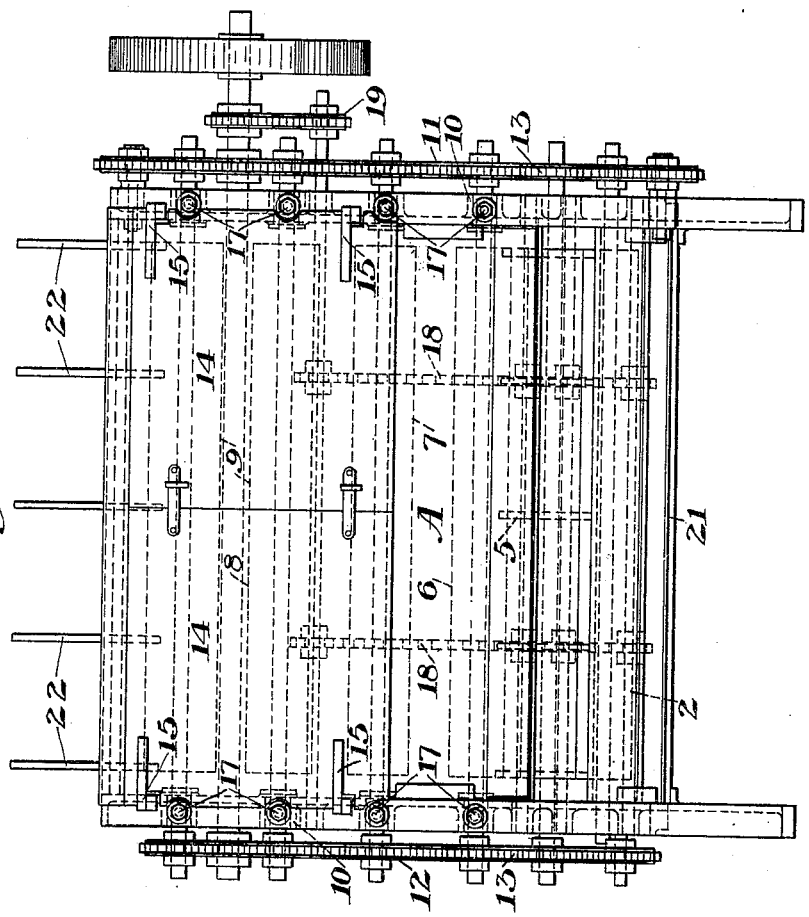

No. 799,979. PATENTED SEPT. 19, 1905.
T. C. EVANS, O. EDWARDS & G. C. STONE.
APPARATUS FOR BRANNING AND DUSTING TIN PLATES.
APPLICATION FILED DEC. 23, 1903.

2 SHEETS—SHEET 1.

WITNESSES
INVENTORS
Thomas C. Evans, Owen Edwards, George C. Stone
by Bakewell & Byrnes
their Attorneys

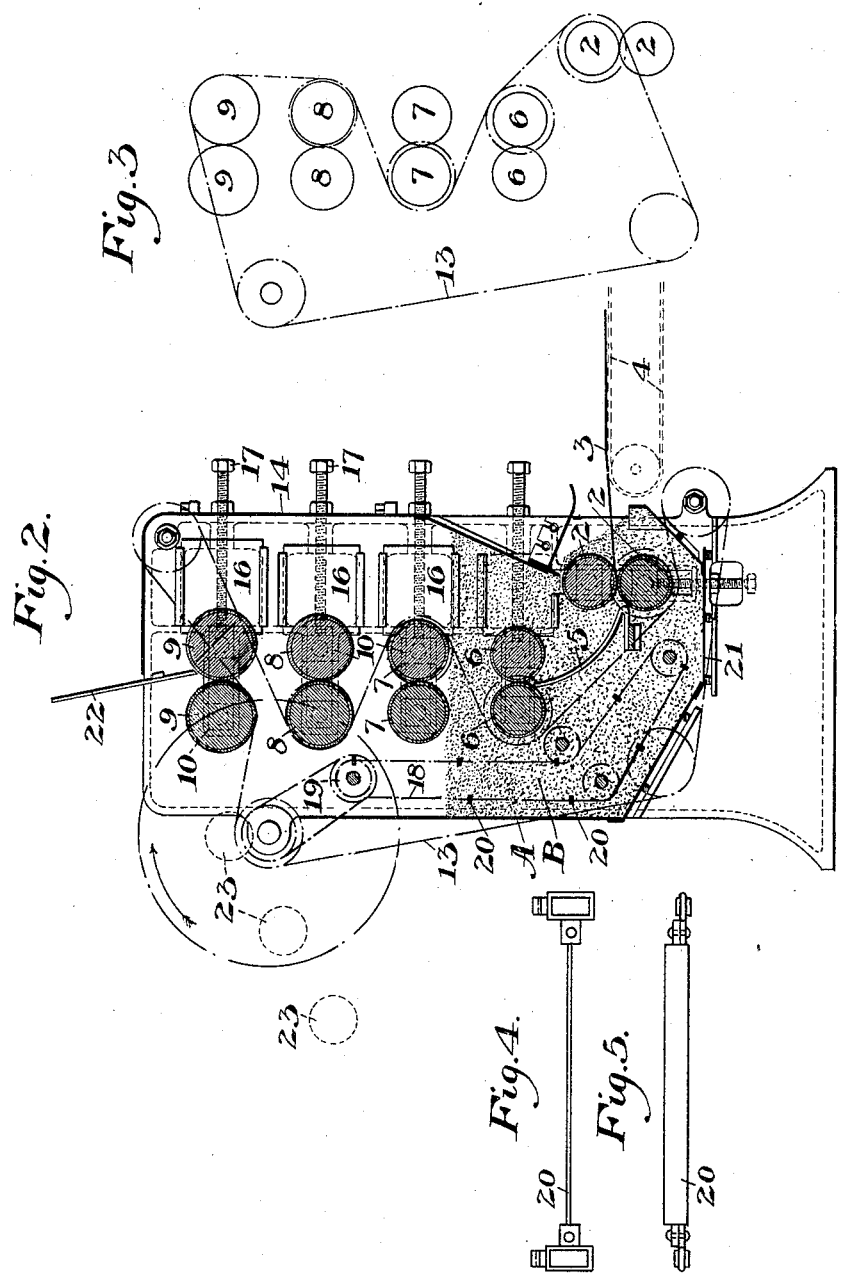

UNITED STATES PATENT OFFICE.

THOMAS C. EVANS, OF ALLEGHENY, OWEN EDWARDS, OF PITTSBURG, AND GEORGE C. STONE, OF AVALON, PENNSYLVANIA, ASSIGNORS TO AMERICAN TIN PLATE COMPANY, OF ORANGE, NEW JERSEY, A CORPORATION OF NEW JERSEY.

APPARATUS FOR BRANNING AND DUSTING TIN-PLATE.

No. 799,979.  Specification of Letters Patent.  Patented Sept. 19, 1905.

Application filed December 23, 1903. Serial No. 186,324.

*To all whom it may concern:*

Be it known that we, THOMAS C. EVANS, of Allegheny, OWEN EDWARDS, of Pittsburg, and GEORGE C. STONE, of Avalon, in the county of Allegheny and State of Pennsylvania, have invented a new and useful Apparatus for Branning and Dusting Tin-Plate, of which the following is a full, clear, and exact description, reference being had to the accompanying drawings, forming part of this specification, in which—

Figure 1 is a front elevation of our improved machine. Fig. 2 is a vertical central section thereof. Fig. 3 is a diagrammatic side elevation illustrating the means for driving the rollers at one end of the machine; and Figs. 4 and 5 are respectively a plan view and an elevation of one of the links of the endless chain which we use for agitating the bran in the machine.

The purpose of branning and dusting tin-plate is to remove from the surface of the plate the oil which remains after the process of tinning and to impart a polish to the surface.

The purpose of our invention is to overcome the difficulties with prior machines and to provide a machine which will operate efficiently and which will deliver plates uninjured by contact with any of the mechanism through which they pass.

In the accompanying drawings, A represents the inclosing box or casing of the machine, in which the branning and polishing rollers are arranged in an upright series. The surfaces of these rollers are covered with felt or sheepskin or like material, and some of them are arranged to rotate within a body B of bran or other absorbent substance. The bottom pair of rolls 2 2 are arranged one above the other, so as to receive the metal plate 3, introduced in a substantially horizontal direction through the front of the machine. The plate is introduced either by means of a feeding-chain 4 or by a suitable chute or by hand. On the delivery side of the rollers 2 2 is a guide 5, which is curved upwardly, so as to deliver the plate from the rolls 2 2 in a vertical position to the next pair of rolls 6 6, and from these rolls the plate passes upwardly between successive pairs of rolls 7 7, 8 8, and 9 9, which may be used in any number sufficient for the purposes of the machine. These rolls are mounted in adjustable bearings 10 10, and on their journals, which project through the sides of the casing, they are provided with sprocket-wheels 11 12, the rolls of each pair having their sprocket-wheels at respectively opposite sides of the casing. This enables a driving-chain 13 to be employed at each side of the machine, and, as shown in Fig. 3, the chain passes in contact with the sprocket-wheel of one of each pair of rolls, the other member of each pair being driven by a corresponding chain and sprocket-wheels at the other side of the casing, as shown in Fig. 2. The pairs of rolls are driven at successively greater peripheral speed, and this is preferably secured by making each pair of rolls of somewhat larger diameter than the rolls of the pair next below. The consequence is that the plate being in the bite of a number of the rolls at once is subjected not only to rolling contact with the rolls, but to an actual frictional or rubbing contact therewith. The casing is preferably provided at the front with doors 14, which are suitably mounted on hinges 15, so that they can be opened to expose the interior of the casing, and at the sides of the casing there are windows closed by doors 16, which are in line with the journal-boxes and rolls and enable the latter to be moved without dismantling the machine. The rolls are provided with suitable adjusting-screws 17.

For the purpose of presenting new branning-surfaces to the plates under treatment we employ an agitator, comprising chains 18, passing around sprocket-wheels 19 and carrying at intervals agitating-bars 20, which are fixed to some of the links. By driving this chain the agitating-bars are caused to travel within the body of bran, and thus maintain it in a state of agitation. At the bottom of the machine is a sliding door 21, enabling the bran to be removed from time to time, and the top of the machine is open for the introduction of new bran.

In the operation of the machine the tin-plate 3 is introduced through the front of the machine between the rolls 2 2 and is then deflected by the guide 5 to the rolls 6 6, through which it passes upwardly, traveling through the body of bran. It thence passes successively between the rolls 7 7, 8 8, and 9 9, which serve to polish the surface from which the oil has been removed by the absorbing action of the bran, and when the plate finally passes from the rolls 9 9 it is deflected toward the back of the machine by a guide 22, which causes it to fall either upon rollers 23 or other suitable conveying mechanism, by which it is conveyed to a pile for removal or to a machine for further treatment, as desired.

The advantages of our invention will be appreciated by those skilled in the art. It produces a minimum of cobbles or bent plates, it does not mar the plates, and as the plates are introduced into the machine in a horizontal direction and are passed upwardly through the bran the machine is easy to feed and yet permits the bran to be applied in the most efficient manner. The upward passage of the plates causes the pressure of the bran to be applied equally on both sides, whereas if the plate were passed horizontally through the body of the bran its under side would be less subject to the weight of the bran and would be less thoroughly cleaned than the upper side. The bran in our machine being in a vertical column acts more or less in the manner of a liquid and presses upon both sides of the plate with a considerable pressure. By introducing the plates into the machine in a different direction from that in which it passes through the machine the loss from escaping of the bran is reduced to a minimum, the rolls at the entrance of the machine acting as a gate which introduces the plates and retains the bran. The efficiency of the machine is also enhanced by the agitating action of the chain 18, which presents new surfaces of bran to the rolls, and thus enables a maximum of work to be obtained from a given quantity of absorbent material.

By the words "bran" and "branning" in the claims we do not intend to restrict ourselves to any particular material, but to cover any loose cleaning material or mixture.

Within the scope of our invention changes may be made in the form and arrangement of the parts, since what we claim is—

1. A branning-machine having sets of rolls arranged successively one above the other to feed the plate upwardly, said machine having feeding-in rolls arranged to receive a plate in a direction different from that in which it passes through the other rolls, a branning-receptacle in which the feed-rolls rotate, and means between the feed-in rolls and the other sets arranged to change the direction of feed of the plate during the passage through the machine; substantially as described.

2. A branning-machine comprising rolls arranged in sets one above the other, feeding-in rolls adapted to receive the plate in a substantially horizontal direction, a branning-receptacle having the feed-in rolls rotating in contact with the bran therein, and a curved guide between the feed-rolls and the other sets of rolls; substantially as described.

3. In a branning-machine, a bran-receptacle, a pair of feeding-in rolls arranged to rotate in contact with the bran in said receptacle, a guide leading from the feed-in rolls and arranged to change the direction of feed of the plates, and a pair of rolls to which the guide leads, the latter pair of rolls having a greater peripheral speed than the feed-in rolls; substantially as described.

4. In a branning-machine, a plurality of pairs of cleaning-rolls arranged above one another, means for driving the upper set at a higher peripheral speed than the lower set, means for holding bran in contact with the lower of said sets, and a pair of feed-in rollers below the lower set and having a lower peripheral speed than said set; substantially as described.

5. In a branning-machine, a plurality of pairs of rolls arranged one above the other, said rolls having cleaning-surfaces, the upper pair having a greater peripheral speed than the lower pair, and means for feeding the sheet forwardly between said rolls; substantially as described.

6. In a branning-machine, a pair of rolls arranged to feed the plate in a general vertical direction, a lower pair of rolls arranged to feed the plate at a different angle, a curved guide extending between the pairs of rolls, and a branning-box inclosing the guide and lower pair of rolls; substantially as described.

7. In a branning-machine, a series of sets of rolls arranged one above the other, the peripheral speed of the sets increasing successively and upwardly; and a branning-box inclosing at least one set of the rolls; substantially as described.

8. A branning-machine comprising a casing containing rolls and a body of absorbent material and a traveling agitator therein; substantially as described.

9. A branning-machine comprising a casing containing rolls and a body of absorbent material and a traveling agitator therein, said agitator consisting of an endless chain carrying agitating-arms; substantially as described.

10. A branning-machine having sets of rolls arranged successively one above the other to feed the plates upwardly, said machine having feeding-in rolls arranged to receive the plate in a direction different from that in which it passes through the other rolls, a branning-receptacle in which the feed-rolls rotate, means between the feed-in rolls and the other sets arranged to change the direction of feed during passage of the plates through the machine, and a branning-box inclosing at least one set of the vertical series of rolls; substantially as described.

11. A branning-machine having sets of rolls arranged successively one above the other to feed the plate upwardly, a branning-box inclosing at least one of said sets of rolls, a lower set of rolls arranged to receive the sheets in a horizontal direction, a guide between said latter set and the vertical sets arranged to change the direction of feed of the plates, and means for holding bran in contact with the lower set of rolls which receive the entering plates; substantially as described.

12. A branning-machine having a lower set of rolls arranged to receive the entering plates in a horizontal direction, a branning-box inclosing said rolls and having a feed-opening registering with the rolls, a curved guide leading from said rolls, vertical sets of rolls arranged one above the other to which the guide leads, and means for holding bran in contact with at least the lowermost set of the vertical series of rolls; substantially as described.

13. A branning-machine having sets of rolls arranged one above the other, said sets having successively higher speed from the bottom to the top sets, and means for holding bran in contact with at least one of said sets; substantially as described.

14. A branning-machine having sets of rolls arranged one above the other, said sets having successively higher speed from the bottom to the top sets, means for holding bran in contact with at least one of said sets, curved guides leading to the lowermost set, and feed-rolls arranged to receive the plates in a horizontal direction and force them along the guides into the lowermost set of the vertical series; substantially as described.

In testimony whereof we have hereunto set our hands.

THOMAS C. EVANS.
    OWEN EDWARDS.
    GEORGE C. STONE.

Witnesses:
 C. W. BRAY,
 G. B. BLEMING.